US009003283B2

(12) United States Patent　　(10) Patent No.:　US 9,003,283 B2
Xu　　(45) Date of Patent:　Apr. 7, 2015

(54) COPYING TEXT USING PARAMETERS DISPLAYED ON A CLIPBOARD

(75) Inventor: Zhong-Lin Xu, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 347 days.

(21) Appl. No.: 13/557,184

(22) Filed: Jul. 24, 2012

(65) Prior Publication Data

US 2013/0232408 A1　Sep. 5, 2013

(30) Foreign Application Priority Data

Mar. 2, 2012　(CN) .......................... 2012 1 0052835

(51) Int. Cl.
*G06F 17/00*　(2006.01)
*G06F 3/0486*　(2013.01)
*G06F 3/0488*　(2013.01)
*G06F 9/54*　(2006.01)
*G06F 17/24*　(2006.01)

(52) U.S. Cl.
CPC ............ *G06F 3/0488* (2013.01); *G06F 3/0486* (2013.01); *G06F 9/543* (2013.01); *G06F 17/24* (2013.01)

(58) Field of Classification Search
None
See application file for complete search history.

(56) References Cited

U.S. PATENT DOCUMENTS

| 5,404,442 | A  | * | 4/1995 | Foster et al. ................... | 715/769 |
| 6,269,389 | B1 | * | 7/2001 | Ashe ............................. | 718/100 |
| 6,944,821 | B1 | * | 9/2005 | Bates et al. .................... | 715/209 |
| 7,496,853 | B2 | * | 2/2009 | Awada et al. .................. | 715/767 |
| 7,516,398 | B2 | * | 4/2009 | Yang .............................. | 715/230 |
| 8,650,507 | B2 | * | 2/2014 | Westerman et al. ........... | 715/863 |
| 8,719,695 | B2 | * | 5/2014 | Weeldreyer et al. ........... | 715/234 |
| 8,756,534 | B2 | * | 6/2014 | Ording et al. .................. | 715/864 |
| 2003/0076364 | A1 | * | 4/2003 | Martinez et al. .............. | 345/810 |
| 2005/0203935 | A1 | * | 9/2005 | McArdle ....................... | 707/101 |
| 2007/0115264 | A1 | * | 5/2007 | Yu et al. ........................ | 345/173 |
| 2008/0002888 | A1 | * | 1/2008 | Yuan ............................. | 382/187 |
| 2012/0110486 | A1 | * | 5/2012 | Sirpal et al. ................... | 715/770 |
| 2013/0191769 | A1 | * | 7/2013 | Park et al. ...................... | 715/770 |
| 2014/0149858 | A1 | * | 5/2014 | Vecera et al. ................. | 715/273 |

\* cited by examiner

*Primary Examiner* — Stephen Hong
(74) *Attorney, Agent, or Firm* — Novak Druce Connolly Bove + Quigg LLP (57) ABSTRACT

A method for text editing is provided. The method includes steps: displaying a text file on a touch display screen; displaying a clipboard alongside of the displayed text file; determining selected text in response to a text selection touch operation; generating parameters representative of the selected text in response to the text selection touch operation; copying the parameters to the clipboard and displaying the parameters on the displayed clipboard in response to a use's first loading operation; finding the text in the text file according to the selected parameters displayed on the displayed clipboard in response to a user's parameter selection operation; and copying the found text from the text file to an intended location in response to a user's second loading operation. A related text editing system is also provided.

10 Claims, 7 Drawing Sheets

COPYING TEXT USING PARAMETERS DISPLAYED ON A CLIPBOARD

BACKGROUND

1. Technical Field

The present disclosure relates to text editing technical field and, particularly, to a text editing system and a method for text editing.

2. Description of Related Art

Today, the functions of portable electronic devices such as smart phones are more and more powerful, and user can do a lot of things on the electronic devices. While reading, user often has some needs of text copying or pasting. However, in the existing text operation system of the portable electronic devices, each time user can only copy one text section and then paste the copied text section to an appointed destination. The user cannot continuously copy several discontinuous text sections, and then paste selectively the text sections to appointed destinations, which are inconvenient for user, and will waste a lot of time.

Furthermore, the copied text section is saved temporarily in the memory, which will occupy a lot of space in the memory.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
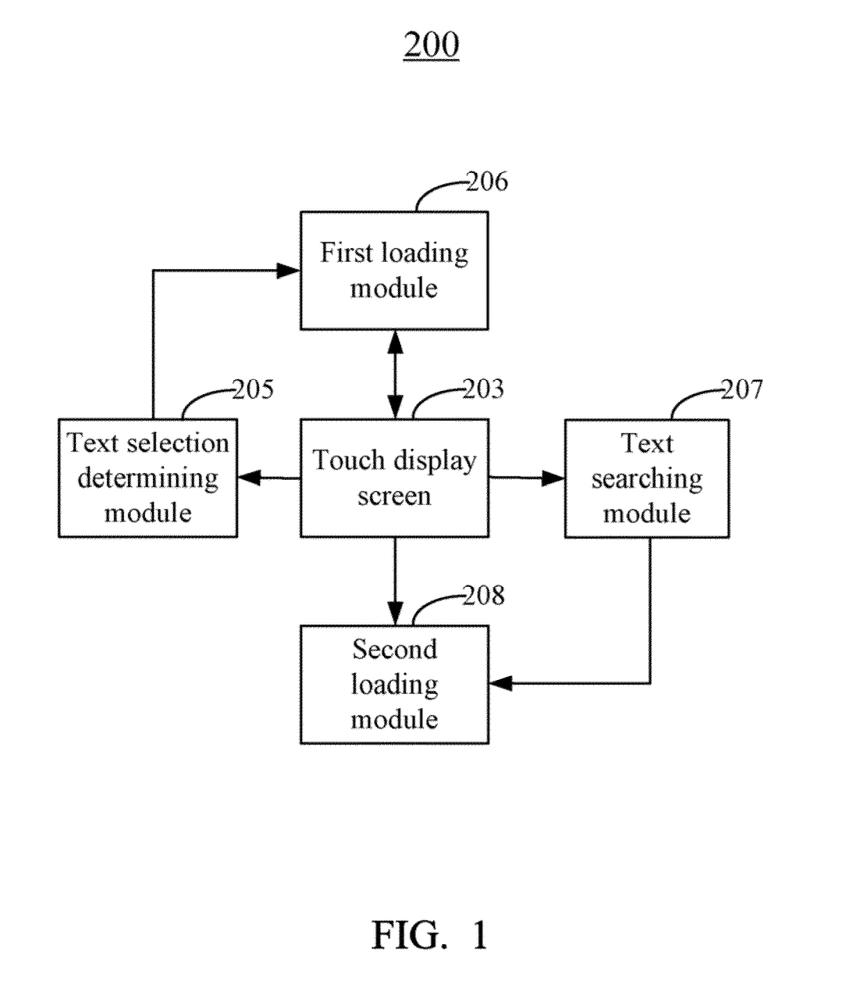
FIG. 1 is a block diagram of a text editing system, according to an embodiment.

Referring to FIG. 1, an exemplary embodiment of a text editing system 200 is shown. The system 200 includes a touch display screen 203, a text selection determining module 205, a first loading module 206, a text searching module 207, and a second loading module 208.

The touch display screen 203 is configured for displaying a text file. If user inputs a predetermined gesture and selects a text in the displayed text file, the touch display screen 203 displays a clipboard alongside of the displayed text file in response to the predetermined gesture, and further determines the selected text in response to a text selection touch operation.

The text selection determining module 205 is configured for generating parameters representative of the selected text in response to the text selection touch operation.

In the embodiment, the selected text can be a number of discrete selected text sections, and the parameters include a number of parameter units each representative of the corresponding selected text section. Each parameter unit includes: a first character of the selected text section, a last character of the selected text section, a serial number, and the amount of the characters of the selected text section.

The first loading module 206 is configured for copying the parameters to the clipboard and controlling the touch display screen to display the parameters on the clipboard in response to a use's first loading operation.

In the embodiment, the first loading operation is defined by user dragging the selected text from the displayed text file to the clipboard. In an alternative embodiment, the first loading operation is defined by another special gesture.

If user selects one or more parameter units displayed on the displayed clipboard, the text searching module 207 finds the text in the text file associated with the selected parameters displayed on the displayed clipboard in response to a user's parameter selection operation. The second loading module 208 is configured for copying the found text from the text file to an intended location in response to a user's second loading operation.

In the embodiment, the second loading operation is defined by user selecting one or more selected parameter units in the clipboard. In an alternative embodiment, the second loading operation is defined by user dragging the selected parameter units from the clipboard to the appointed destination.

It should be understood that, in another embodiment, the text editing system 200 further includes a text deleting module configured for deleting the selected parameter units in the clipboard in response to a user's second loading operation.

Figure 2:
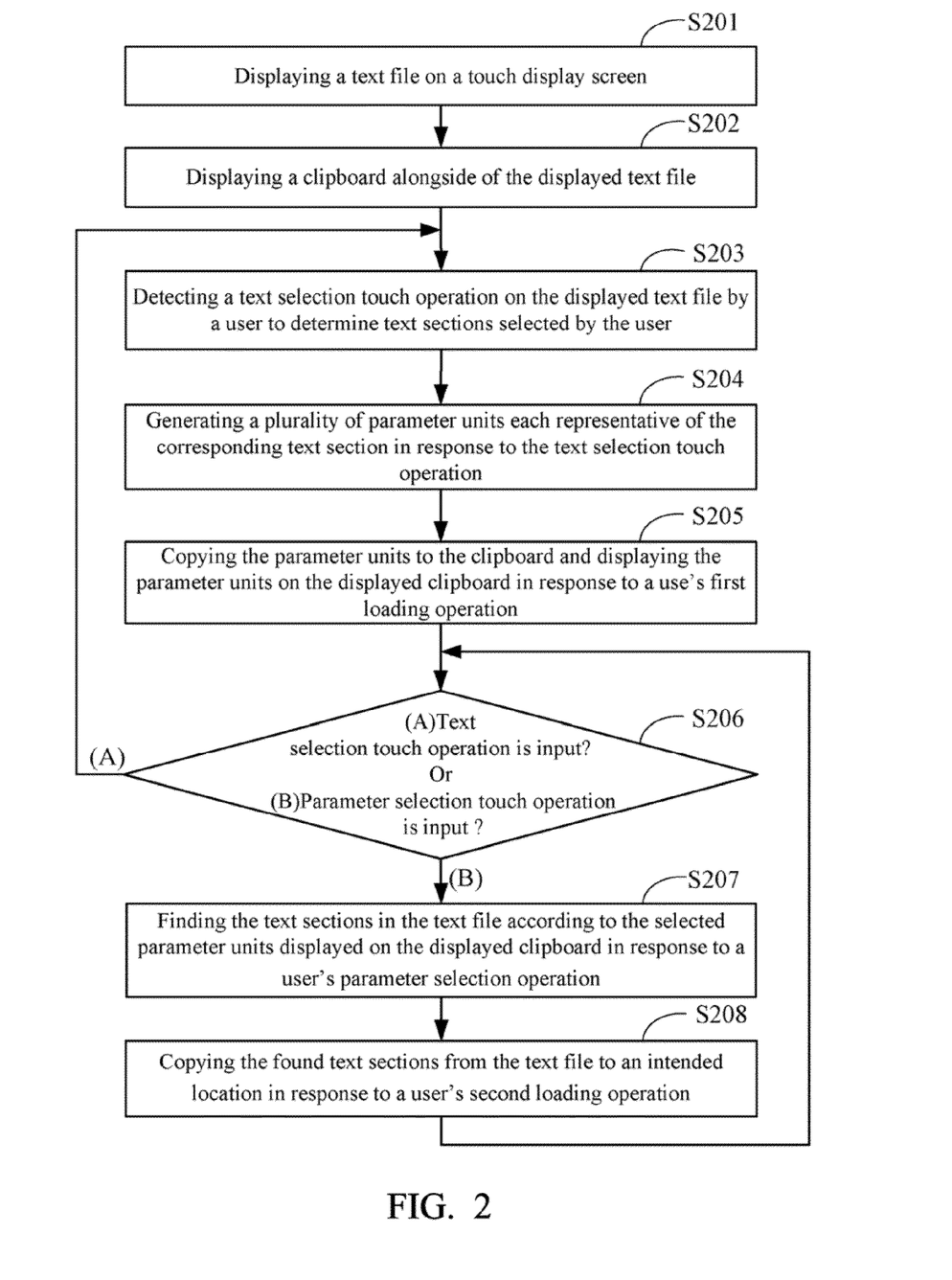
FIG. 2 is a flowchart illustrating a method for text editing, according to an embodiment.

Referring to FIG. 2, is a flowchart illustrating a method for text editing.

In step S201, the touch display screen 203 displays a text file.

In step S202, the touch display screen 203 displays a clipboard alongside of the displayed text file.

In step S203, the touch display screen 203 detects a text selection touch operation on the displayed text file by a user to determine text sections selected by the user.

In step S204, the text selection determining module 205 generates a number of parameter units each representative of the corresponding selected text section in response to the text selection touch operation.

In step S205, the first loading module 206 copies the parameter units to the clipboard and controls the touch display screen 203 to display the parameter units on the displayed clipboard in response to a use's first loading operation. In the embodiment, the displayed parameter units are arranged in a sequence corresponding to the sequence of selecting the text sections. Thereby, a copy operation is finished.

In step S206, the touch display screen 203 detects whether text selection touch operation is input on the displayed text file by a user, or whether parameter selection touch operation is input on the displayed clipboard by a user. If the touch display screen 203 detects that text selection touch operations are input on the displayed text file by a user, the procedure returns to step S203; if the touch display screen 203 detects that parameter selection touch operations are input on the displayed clipboard by a user, the procedure goes to step S207.

In step S207, the text searching module 207 finds the text sections in the text file according to the selected parameter units displayed on the displayed clipboard in response to a user's parameter selection operation.

In step S208, the second loading module 208 copies the found text sections from the text file to an intended location in response to a user's second loading operation. In the embodiment, the found text sections are arranged in a sequence corresponding to the sequence of selecting the parameter units. Thereby, a paste operation is finished, and then the procedure returns to step S205.

It should be understood that, all the application interfaces described above can be a browser interface, a notepad interface, a message interface, or other text interface.

Thereby, the problem in the existing art that user cannot continuously copy or paste several discontinuous text sections is solved.

FIGS. 3-7 are exemplary text editing interfaces showing the process of copying and pasting.

Figure 3:
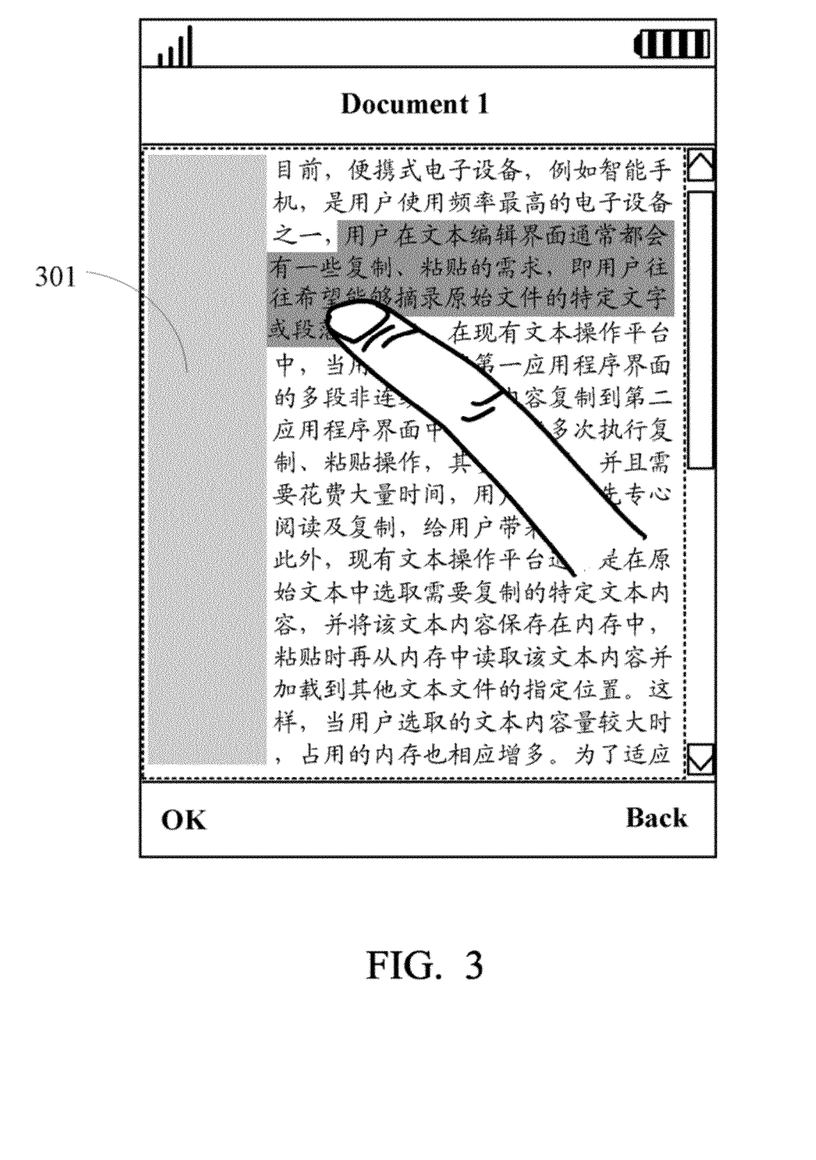
FIGS. 3-7 are exemplary text editing interfaces showing the process of copying and pasting.
Figure 4:
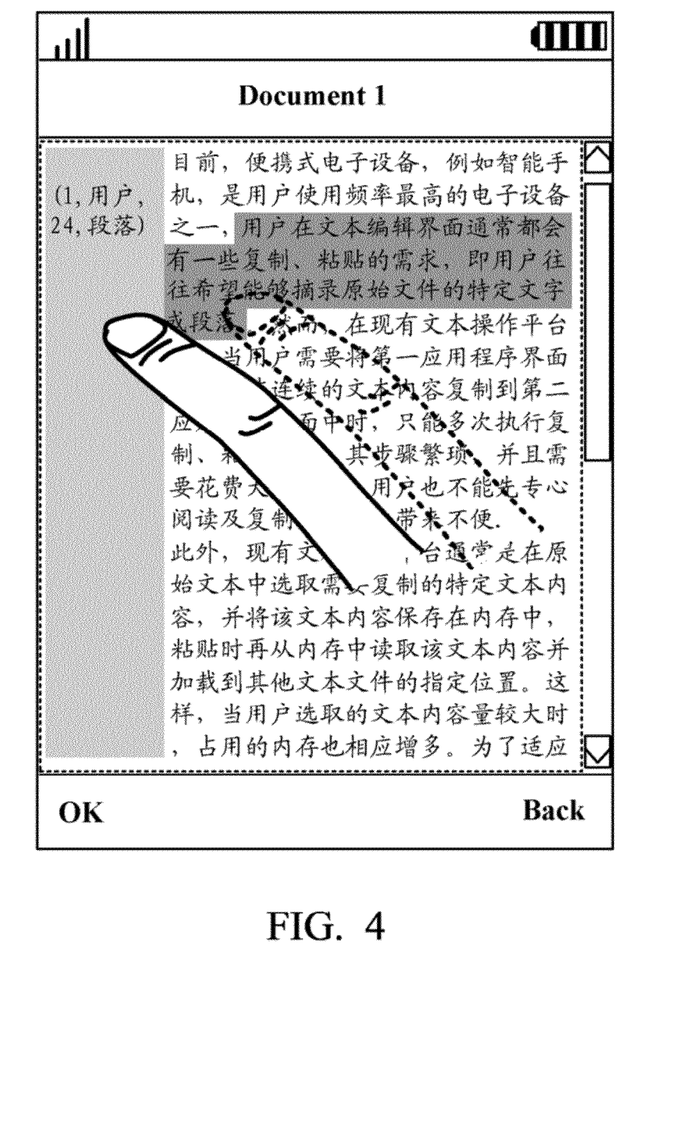
Figure 5:
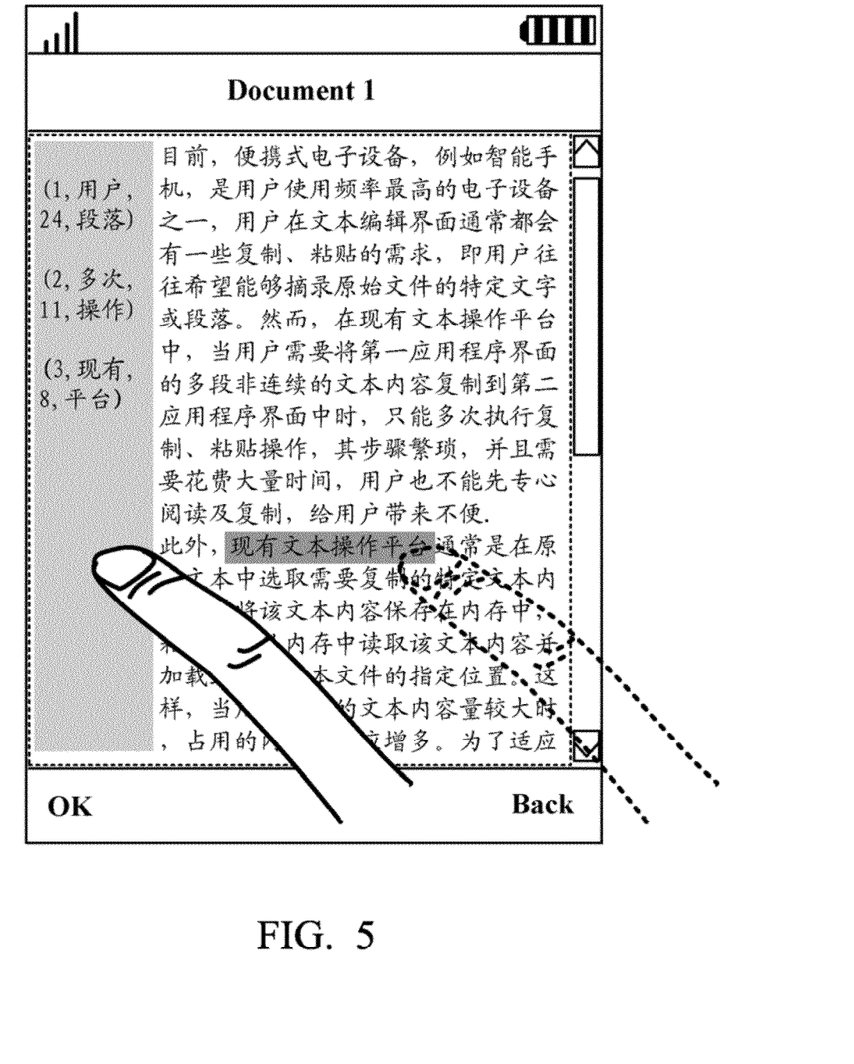
Figure 6:
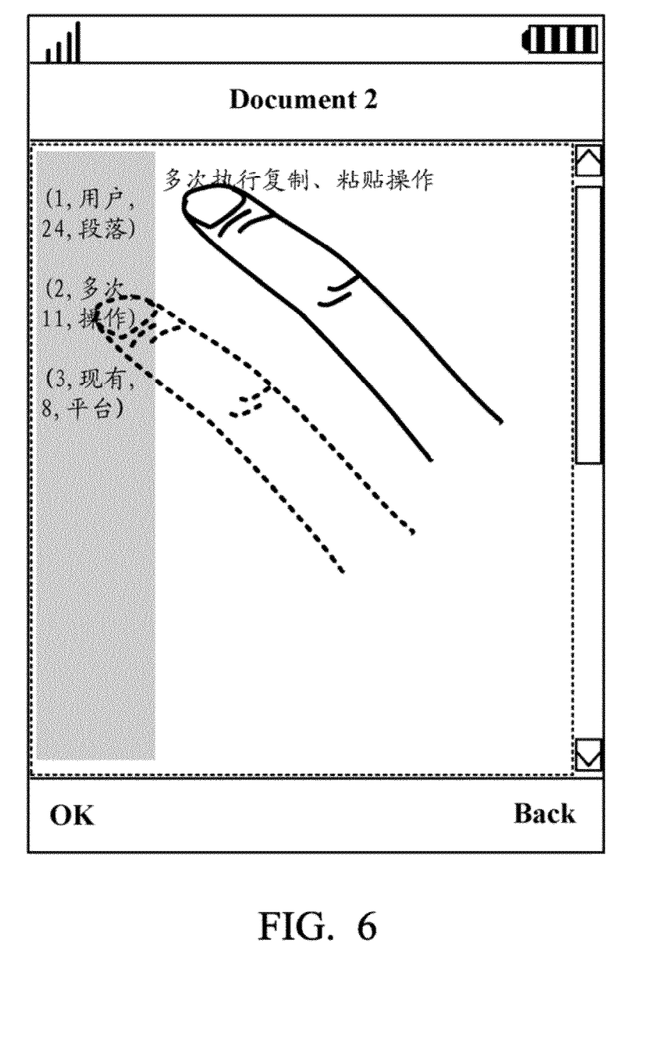
Figure 7:
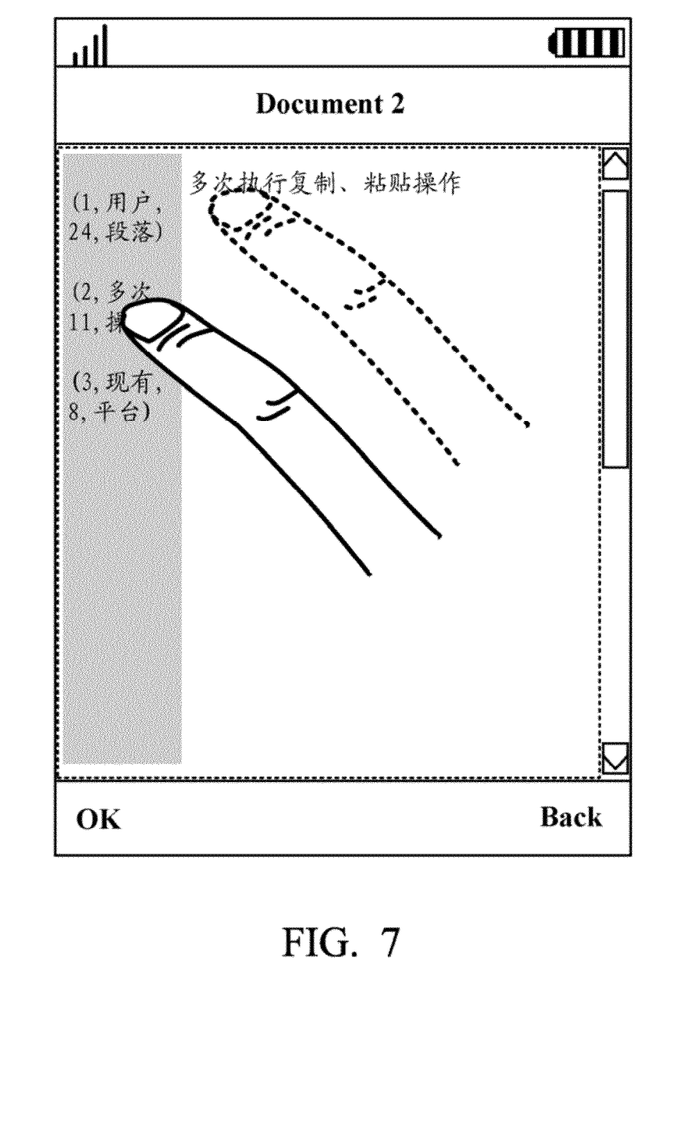

Referring to FIG. 3, when user presses on a displayed text file, such as "Document 1", for several seconds, the clipboard 301 pops-up automatically alongside of the displayed text file (the clipboard can also be popped-up by user inputting another special gesture or pressing a physical button). If user selects a text section to be copied in the displayed text file, and drags them to the clipboard 301 (or inputs a special gesture or presses a physical button), as shown in FIG. 4, the parameter unit corresponding to the selected text section is then loaded automatically to the clipboard. Referring to FIG. 5, another text section in the displayed text file, can be also selected and dragged to the clipboard, When user switches the current displayed text file to a new text file, for example, from "Document 1" to "Document 2", if user presses on the new text file for several seconds (or inputs a special gesture, or presses a physical button), the clipboard containing parameter units loaded previously pops-up automatically in the new text file. Referring to FIG. 6, if user selects one or more parameter units in the clipboard and drags them to an appointed destination in the new text file, the text sections corresponding to the selected parameter units are then loaded automatically to the appointed destination. Referring to FIG. 7, in an alternative embodiment, when user appoints the appointed destination in the new text file, and then selects one or more parameter units in the clipboard, the text sections corresponding to the selected parameter units are then loaded automatically to the appointed destination.

Therefore, user can continuously copy or paste several discrete text sections, which are convenient for user, and will save a lot of time for user. Furthermore, only the parameter units associated to the selected text sections to be copied are saved in the clipboard, which will reduce the space in the memory occupied by the selected text sections to be copied.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A text editing system comprising:
   a touch display screen configured for displaying a text file, the touch display screen configured for determining a selected text in response to a text selection touch operation, the touch display screen configured for further displaying a clipboard alongside of the displayed text file in response to a predetermined gesture;
   a text selection determining module configured for generating parameters representative of the selected text in response to the text selection touch operation;
   a first loading module configured for copying the parameters to the clipboard and controlling the touch display screen to display the parameters on the clipboard in response to a user's first loading operation;
   a text searching module configured for, in response to a user's selection of the parameters displayed in the clipboard, finding the text in the text file according to the selected parameters; and
   a second loading module configured for copying the found text from the text file to an intended location in response to a user's second loading operation.

2. The system as described in claim 1, wherein the selected text includes a plurality of discrete selected text sections, and the parameters include a plurality of parameter units each representative of the corresponding selected text section.

3. The system as described in claim 2, wherein each parameter unit includes: a first character of the selected text section, a last character of the selected text section, a serial number, and the amount of the characters of the selected text section.

4. The system as described in claim 1, further comprising a text deleting module configured for deleting the selected parameters in the clipboard in response to a user's second loading operation.

5. A method for text editing, the method comprising:
   displaying a text file on a touch display screen;
   displaying a clipboard alongside of the displayed text file;
   determining selected text in response to a text selection touch operation;
   generating parameters representative of the selected text in response to the text selection touch operation;
   copying the parameters to the clipboard and displaying the parameters on the displayed clipboard in response to a user's first loading operation;
   in response to a user's selection of the parameters displayed in the clipboard, finding the text associated with the selected parameters in the text file; and
   copying the found text from the text file to an intended location in response to a user's second loading operation.

6. The method as described in claim 5, wherein the selected text includes a plurality of discrete selected text sections, and the parameters include a plurality of parameter units each representative of the corresponding selected text section.

7. The method as described in claim 6, wherein the displayed parameter units are arranged in a sequence corresponding to the sequence of selecting the text sections.

8. The method as described in claim 6, wherein each parameter unit includes a first character of the selected text section, a last character of the selected text section, a serial number, and the amount of the characters of the selected text section.

9. A method for text editing, the method comprising:
   displaying a text file on a touch display screen;
   displaying a clipboard alongside of the displayed text file;
   detecting text selection touch operations on the displayed text file by a user to determine text sections selected by the user;
   generating a plurality of parameter units each representative of the corresponding text section in response to the respective text selection touch operations;
   copying the parameter units to the clipboard and displaying the parameter units on the displayed clipboard in response to a use's first loading operation;
   detecting parameter selection touch operations on the displayed clipboard by a user to determine the parameter units selected by the user;
   finding the text sections in the text file according to the selected parameter units displayed on the displayed clipboard in response to a user's parameter selection operation; and
   copying the found text sections from the text file to an intended location in response to a user's second loading operation.

10. The method as described in claim 9, wherein the found text sections are arranged in a sequence corresponding to the sequence of selecting the parameter units.

\* \* \* \* \*